C. SINTZ.
TRACTOR.
APPLICATION FILED OCT. 15, 1913.
1,298,262.
Patented Mar. 25, 1919.
3 SHEETS—SHEET 1.
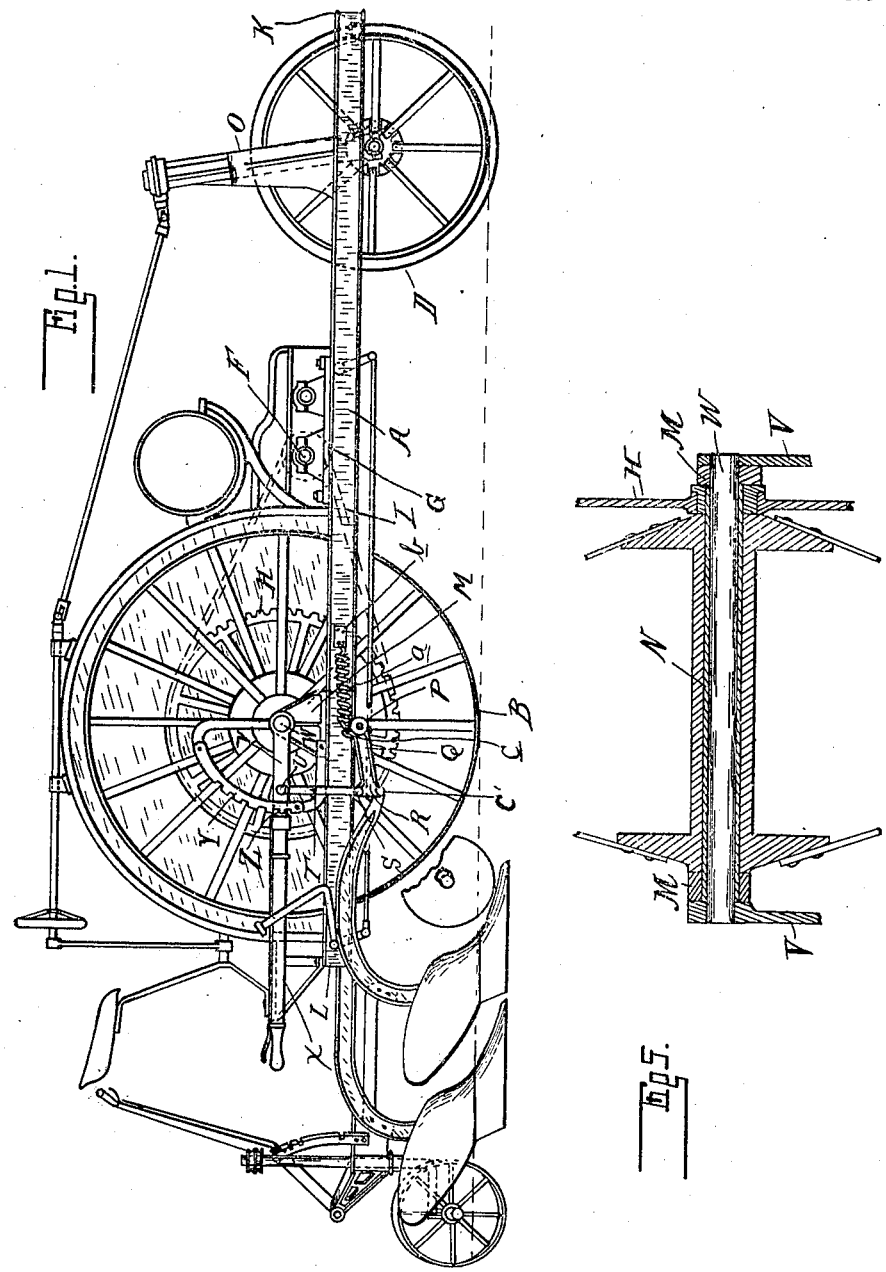
Witnesses
H. K. Ford
James P. Barry
Inventor
Claude Sintz

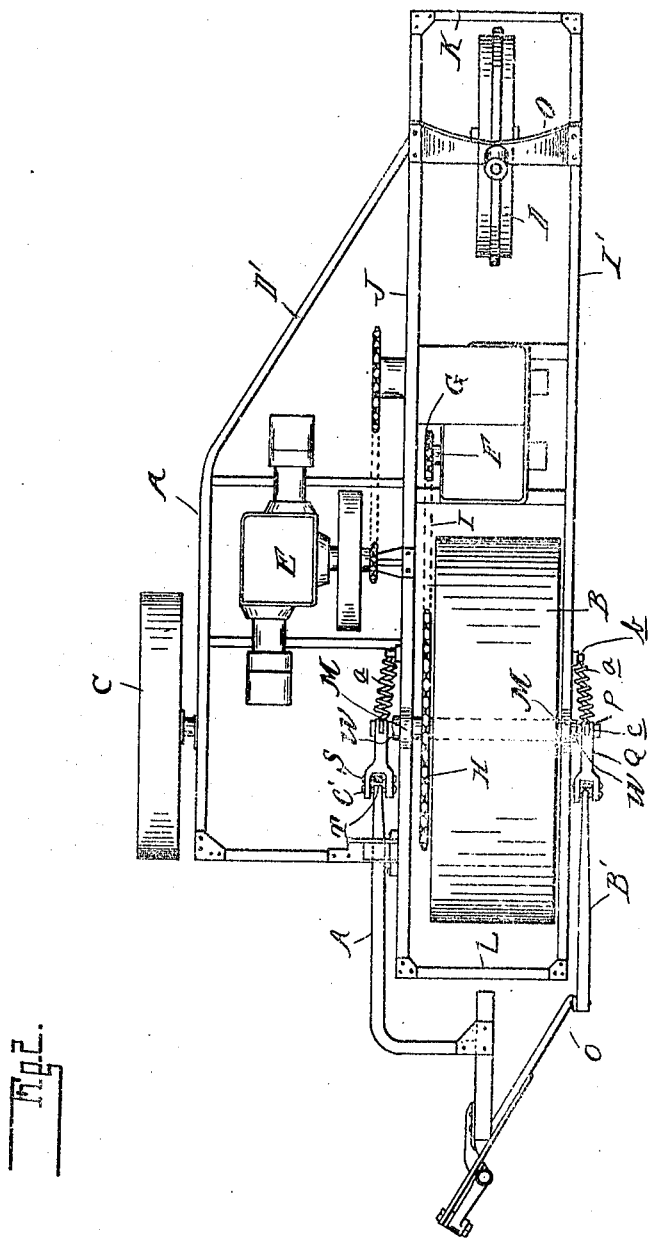

C. SINTZ.
TRACTOR.
APPLICATION FILED OCT. 15, 1913.
1,298,262.
Patented Mar. 25, 1919.
3 SHEETS—SHEET 3.
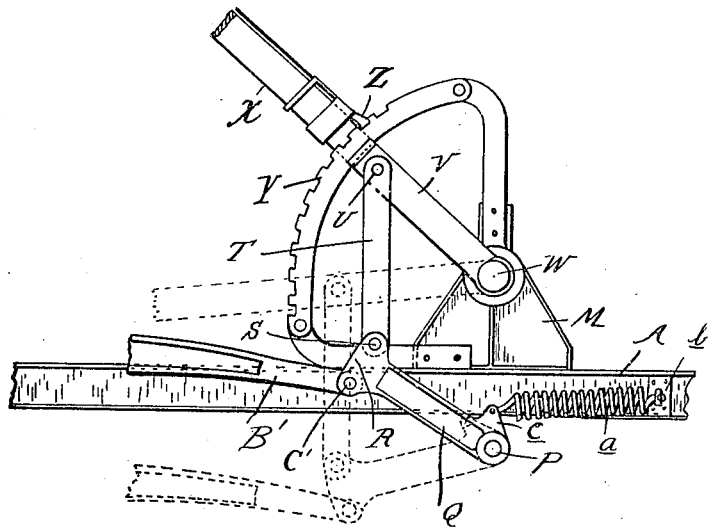
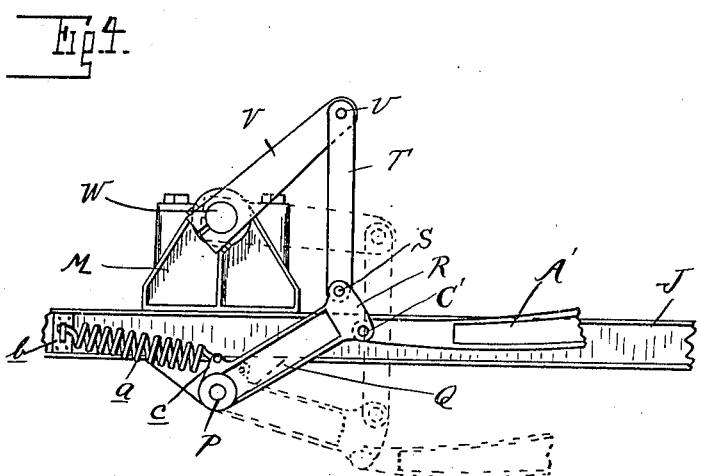
Witnesses
W. K. Frod
James P. Barry
Inventor
Claude Sintz.

UNITED STATES PATENT OFFICE.

CLAUDE SINTZ, OF DETROIT, MICHIGAN, ASSIGNOR TO STEEL KING MOTOR PLOW COMPANY, OF DETROIT, MICHIGAN, A CORPORATION OF MICHIGAN.

TRACTOR.

1,298,262.     Specification of Letters Patent.     Patented Mar. 25, 1919.

Application filed October 15, 1913. Serial No. 795,186.

*To all whom it may concern:*

Be it known that I, CLAUDE SINTZ, a citizen of the United States of America, residing at Detroit, in the county of Wayne and State of Michigan, have invented certain new and useful Improvements in Tractors, of which the following is a specification, reference being had therein to the accompanying drawings.

My invention relates to tractors and more particularly to tractors for propelling farming implements or the like.

The invention resides in the novel construction and arrangement of the connection between the load and the tractor, and in certain combinations as will more fully hereinafter appear.

In the drawings,—

Figure 1 is a side elevation of the device embodying the invention;

Fig. 2 is a top plan view thereof with certain parts removed;

Figs. 3 and 4 are enlarged views illustrating the connection between the tractor and the implement; and Fig. 5 is a sectional detail view.

A designates the frame of the tractor, B C the wheels arranged adjacent one end of the frame, and D the steering wheel positioned adjacent the opposite end of the frame A. The main traction wheel B is driven from a suitable motor E which is arranged upon the frame A, the driving connection being herein shown as comprising a drive shaft F having a sprocket G connected by means of a chain I to a gear H that is attached to the wheel. With this general type of tractor, that is—where the wheel or wheels adjacent one end of the frame only are driven, the driving mechanism transmits to the end of the frame adjacent to which is the undriven wheel or wheels, a force tending to move the frame about the axis of the driving wheel. To overcome this tendency constructions have been employed in which considerable weight has been positioned adjacent the undriven wheel or wheels, but this is objectionable, for the weight is not properly distributed for both heavy and light tractor loads. With my improved construction the connection between the self-propelled tractor and the load is such that the latter transmits to the tractor frame a force proportioned in relation to and opposing the force transmitted by the driving mechanism.

While my invention may be embodied in various constructions, in order to give a better understanding of the improvement I will describe the same in connection with a tractor in which the main traction wheel B is arranged at the rear end of the frame and the steering wheel D at the front end of the frame, the load being pulled by the tractor.

As shown the frame A is composed of side bars I' J connected at opposite ends by cross-bars K L, the side bars being provided adjacent the rear ends of the frame with upwardly-extending bearings M for the axle N of the wheel B. O is a yoke connected to the side bars adjacent their forward ends and having a centrally, vertically-extending bearing for receiving the steering spindle of the yoke which carries the axle upon which the wheel D is journaled, this mounting for the steering wheel being of well-known construction and therefore, not illustrated in detail.

With this construction it will be seen that the resistance offered to the turning of the wheel B will cause the driving mechanism to transmit a force to the forward end of the frame, tending to lift the same, and whenever the force required to move the load becomes greater than the force required for lifting the frame upward, the forward end of the frame would be rocked upwardly about the axis of the wheel B, providing the motor has sufficient power. Shifting of the weight toward or adding weight to the forward end of the frame to overcome rearing of the forward end is not desirous, since with ordinary loads the steering wheel will be forced into the ground if the latter is soft, preventing proper steering of the tractor and also increasing the power required to move the tractor.

With my improvement the load which is herein shown as comprising a plow, is as before stated, connected to the tractor so as to transmit to the frame a force acting in a direction to oppose the force transmitted to the frame by the driving mechanism. This connection may be of various constructions but in the drawing I have shown the preferred form thereof. Thus, pivotally connected to each side bar I' J at P is an arm Q which has its outer end R pivotally connected at S to one end of a link T. The opposite end of this link is pivotally connected at U to an arm V fixedly connected to a shaft W. This shaft extends through and is journaled in the axle N, which is hollow. At one side of the frame one of the arms as V is provided with an integral extension X which forms a lever for rocking the shaft W to raise and lower the arm Q. The lever X is held in its different positions of adjustment by means of a tooth segment Y rigidly attached to the frame, and a dog Z carried by the lever and adapted to engage the teeth of the segment. The plow is provided with forwardly-extending arms A′ B′ arranged upon opposite sides of the frame and pivotally connected at C′ to the outer ends of the arms Q.

When the parts are in the position shown in full lines in Fig. 1, the arms Q which in effect constitute levers, will transmit a force to the frame A, tending to move the forward end of the frame downward. The leverage of the connection is so computed as to proportion the force acting to move the frame downward in relation to the force of the driving mechanism acting to move the frame upward, the weight upon the forward end of the frame being of course, taken into consideration. As the load increases it will be apparent that the opposing forces are also increased, but when considerable additional load is to be added the arms Q are shifted farther downward—see dotted lines in Figs. 3 and 4—thereby increasing the leverage through which acts the force tending to move the forward end of the frame downward and properly proportioning such force in relation to the increased upwardly acting force, caused by the additional power required to move the tractor.

By the construction illustrated, when the plow is lowered to increase the depth of the furrow—which necessarily increases the load—the leverage of the connection is automatically increased. Furthermore, the arrangement in all positions of adjustment of the plow is such that the load acts upon the members Q in lines substantially parallel to the sides of the frame. The link T and arm Q provide in effect a toggle lever, and therefore, permit the vertical adjustment of the implement to be easily effected. In order to further assist in allowing the vertical adjustment of the implement to be readily effected when the plowshares are in the ground, a spring $a$ is provided which is connected at one end to the side-bar of the frame as at $b$, and has its opposite end attached to an outwardly-projecting crank $c$ on the arm Q. Preferably each arm Q is provided with such a spring.

Preferably the frame A is provided with an extension D′ at one side thereof which carries the wheel C, so as to give the desired stability to the frame against sidewise tipping. The axis of the wheel C is in alinement with the axis of the wheel B, but the former wheel is not driven.

My invention while exceedingly desirable, and particularly applicable for connecting plows to self-propelled tractors, is of course, adapted for attaching other implements to tractors and I do not desire to limit my invention to the particular embodiment illustrated or the specific arrangement of parts shown.

What I claim as my invention is:—

1. The combination with a self-propelled tractor including a frame, a traction wheel and a steering wheel, the dead weight on said frame being distributed with a predeterminedly limited load upon the steering wheel, of means for propelling the tractor reacting counter to the dead load on the steering wheel, a draft load, and an adjustable connection for said draft load to said frame constructed to transmit a force to the frame counter to the reactive force from the propelling mechanism and proportioned thereto to substantially neutralize the turning effect upon the same.

2. The combination with a self-propelled tractor, including the frame and wheel, bearings on said frame, a hollow axle for said wheel journaled in said bearings, arms arranged upon opposite sides of said frame and pivotally connected thereto, a shaft extending through said hollow axle, arms connected to the opposite ends of said shaft, links connecting the last-mentioned arms with the first-mentioned arms, a device having portions pivotally connected to the first-mentioned arms, and an adjusting lever forming an extension of one of the arms attached to said shaft.

3. The combination of a self-propelled tractor, including the frame and means for propelling the tractor, said means transmitting a force to the frame tending to move one end of the frame in a direction transverse to the tractive movement of the tractor, an arm pivotally connected to the frame, an adjusting lever, a link having its opposite ends respectively pivotally connected to said lever and to said arm, means for holding said lever in its different positions of adjustment, a load, and a connection between said load and said arm, the proportion of the parts being such that the reaction of the load substantially counterbalances the reaction of the tractor to maintain a substantially constant holding-down force.

4. The combination of a self-propelled tractor, including the frame, a driven wheel and means for driving the wheel, said means transmitting a force to the frame tending to move one end of the frame upwardly, a load, and a connection between the load and the frame constructed to transmit a force to the frame proportioned in relation to the first-mentioned force and acting to oppose the same, said connection comprising arms connected to the frame upon opposite sides of the wheel and to which said load is attached, the proportion of the parts being such that the reaction of the load substantially counterbalances the reaction of the tractor to maintain a substantially constant holding-down force.

5. The combination of a self-propelled tractor, including the frame, a driven wheel and means for driving the wheel, said means transmitting a force to the frame tending to move one end of the frame upwardly, a load, and a connection between the load and the frame constructed to transmit a force to the frame proportioned in relation to the first-mentioned force and acting to oppose the same, said connection comprising arms upon opposite sides of the wheel and to which said load is attached and means for simultaneously adjusting said arms, the proportion of the parts being such that the reaction of the load substantially counterbalances the reaction of the tractor to maintain a substantially constant holding-down force.

In testimony whereof I affix my signature in presence of two witnesses.

CLAUDE SINTZ.

Witnesses:
WM. J. BELKNAP,
H. F. MOELLER.

Copies of this patent may be obtained for five cents each, by addressing the "Commissioner of Patents, Washington, D. C."